United States Patent
Lukjan (10) Patent No.: US 7,393,021 B1
(45) Date of Patent: Jul. 1, 2008

(54) HVAC DUCT SYSTEM

(75) Inventor: Serge Lukjan, Newburgh, IN (US)

(73) Assignee: M. Zack Lukjan, Stamping Ground, KY (US)

( * ) Notice: Subject to any disclaimer, the term of this patent is extended or adjusted under 35 U.S.C. 154(b) by 415 days.

(21) Appl. No.: 11/274,244

(22) Filed: Nov. 15, 2005

(51) Int. Cl.
*F16L 25/00* (2006.01)

(52) U.S. Cl. .............. 285/424; 285/183; 285/222.4

(58) Field of Classification Search ............. 285/424, 285/252, 259, 305, 183, 915, 222.4
See application file for complete search history.

(56) References Cited

U.S. PATENT DOCUMENTS

| | | | |
|---|---|---|---|
| 2,808,825 A | | 10/1957 | Solomon |
| 2,880,017 A | | 3/1959 | Anderson et al. |
| 3,074,459 A | | 1/1963 | Pavia |
| 3,596,936 A | | 8/1971 | Dieckmann et al. |
| 3,819,209 A | | 6/1974 | Anderson et al. |
| 3,915,477 A | | 10/1975 | Timmons |
| 4,009,895 A | | 3/1977 | Koskolos |
| 4,099,747 A | * | 7/1978 | Meserole .......... 285/424 |
| 4,569,110 A | * | 2/1986 | Goettel ............ 285/424 |
| 4,620,729 A | * | 11/1986 | Kauffman ........ 285/424 |
| 4,930,815 A | * | 6/1990 | Tuggler, Jr. ...... 285/424 |
| 5,133,579 A | * | 7/1992 | Anderson et al. .. 285/424 |
| 5,145,217 A | | 9/1992 | Anderson et al. |
| 5,158,328 A | * | 10/1992 | Anderson et al. .. 285/424 |
| 5,199,190 A | * | 4/1993 | Mayer et al. ...... 285/424 |
| 5,741,030 A | | 4/1998 | Moore et al. |
| 6,026,803 A | * | 2/2000 | Wawrla ........... 285/424 |
| 6,244,633 B1 | | 6/2001 | Warren |
| 6,497,434 B2 | | 12/2002 | Pettersson et al. |
| 6,616,193 B2 | | 9/2003 | Anderson |
| 6,767,280 B1 | * | 7/2004 | Berger ............ 285/305 |

FOREIGN PATENT DOCUMENTS

JP 06058471 A * 3/1994

* cited by examiner

*Primary Examiner*—David E Bochna
(74) *Attorney, Agent, or Firm*—Stites & Harbison, PLLC; David W. Nagle, Jr.; William C. Ferrell, Jr.

(57) ABSTRACT

A duct system generally comprises a flexible duct; a fitting having an end including either an in-turned circumferential lip or a plurality of circumferentially arranged tabs; a collar having a first end and a second end, the first end being adapted to be secured to the flexible duct, and the second end being adapted to be secured to the end of the fitting, such that, if the second end of the fitting includes an in-turned circumferential lip, the second end of the collar includes a plurality of circumferentially arranged tabs adapted to engage the in-turned circumferential lip, and if the end of the fitting includes a plurality of circumferentially arranged tabs, the second end of the collar includes an in-turned circumferential lip adapted to engage the plurality of circumferentially arranged tabs; and at least one gasket for forming a seal between the fitting and the collar.

12 Claims, 7 Drawing Sheets

HVAC DUCT SYSTEM

FIELD OF THE INVENTION

The present invention relates to heating, ventilation, and air conditioning (HVAC) systems and components, and, more particularly, to an HVAC duct system.

BACKGROUND OF THE INVENTION

In the HVAC industry, flexible ducts are often used to connect a rigid sheet metal trunk (supply or return) duct to a terminal fitting, such as a boot (i.e., a transitional fitting with a round aperture at one end for connection to the flexible duct and a rectangular opening at the other end into which a register or grill may be fitted). Such a flexible duct generally comprises an inner sleeve of a Mylar® or similar polyester film containing a coil of wire to give it shape. (Mylar® is a registered trademark of the E.I. du Pont de Nemours and Company of Wilmington, Del.) This inner sleeve is then wrapped in fiberglass insulation, with an outer sleeve made of plastic or aluminum serving as an outermost layer for containing the insulation.

Currently, installation of such flexible ductwork first requires cutting a hole into the trunk duct, and then securing a fitting to the trunk duct using tabs and, optionally, a sealing adhesive gasket. The flexible duct is connected to the fitting by pulling the inner sleeve over the fitting, and then wrapping tape over the inner sleeve and fitting to secure and seal the flexible duct to the fitting. The insulation and outer sleeve are then pulled against the fitting with a zip tie. Of course, this is repeated at the terminal fitting. Such installation in the field is awkward and time consuming because the locations for connections are often cramped and difficult to reach, and the method requires wrapping the tape around the fittings while affixed in their permanent positions. Furthermore, the resultant connection is of variable quality and strength, and often leaks air. Accordingly, there remains a need in the art for an HVAC duct system that is easy to install and minimizes the likelihood of air leakage.

SUMMARY OF THE INVENTION

The present invention meets the above-identified needs, and others, by providing an HVAC duct system which includes a flexible duct, a fitting, a collar, and at least one sealing gasket.

The flexible duct is presumed to be substantially identical in structure and function to existing flexible ducts widely used in HVAC applications. As mentioned above, such a flexible duct generally comprises an inner sleeve of a Mylar® or similar polyester film containing a coil of wire to give it shape. This inner sleeve is then wrapped in insulation (e.g., fiberglass), with an outer sleeve made of plastic or aluminum serving as an outermost layer for containing the insulation.

The fitting of the duct system has two ends. One end may be of any design useful as an inlet or outlet for delivery of air, for example, a rectangular shape adapted to receive a floor or wall register or grill. The other end of the fitting is adapted to be secured to the collar of the flexible duct system of the present invention, and thus is provided with either a plurality of circumferentially arranged tabs or an in-turned circumferential lip. In this regard, the collar is a generally thin-walled cylinder with two ends. One end is adapted to be secured to the flexible duct, while the other end is adapted to be secured to the fitting, having either a plurality of circumferentially arranged tabs or an in-turned circumferential lip. Specifically, the collar and fitting of the duct system of the present invention are designed such that if the collar has a plurality of circumferentially arranged tabs, the fitting includes an in-turned circumferential lip, and vice versa. The end of the component that includes the plurality of circumferentially arranged tabs is designed to fit inside the component with the in-turned circumferential lip, which design may be further facilitated by a crimped portion which reduces the circumference of the end of the component containing the plurality of circumferentially arranged tabs. Furthermore, the tabs may be button punches, designed such that they flex radially inward as the collar is slid onto or into to the fitting, and then extend radially when the tabs pass the in-turned circumferential lip.

Finally, the duct system also includes at least one sealing gasket, such that when completely assembled, a seal is formed between the flexible duct and the fitting to minimize air leakage.

To install the flexible duct system of the present invention, the user first secures the fitting into place and cuts the flexible duct to an appropriate length. The user then secures a collar to one end of the flexible duct. Unlike duct systems of the prior art, this can be done on the ground or in another location away from the typically cramped, inconvenient location of the in-place fitting. To secure the collar to a typical flexible HVAC duct, the user slides the insulation and outer sleeve away from one end of the duct such that a portion of the inner sleeve is exposed. The user then inserts the end of the collar adapted for such purpose into the inner sleeve of the flexible duct such that the inner sleeve contacts a gasket circumferentially arranged around the collar. This gasket is preferably a tape with two adhesive sides, such that the gasket is secured to the collar by the adhesive on one side of the tape, and secured to the flexible duct by the adhesive on the other side of the tape. The user next slides the outer sleeve and insulation of the flexible duct back towards the collar, and then tightens a zip tie circumferentially around the outer sleeve of the flexible duct and the collar.

The collar and fitting are secured to one another by interlocking the plurality of circumferentially arranged tabs on one component with the in-turned circumferential lip on the other component. To connect the collar, which is now secured to the flexible duct, to the fitting, the user simply slides the collar into or onto the fitting so that the plurality of circumferentially arranged tabs on one component extend radially, engaging and interlocking with the in-turned circumferential lip on the other component, with the component having the in-turned circumferential lip contacting the gasket so as to form a seal.

Compared to the prior art, which requires taping and tying the flexible duct directly to the fitting, the duct system of the present invention is a more air-tight, reliable, and convenient system which can be easily installed. Moreover, because the collars can be placed in each end of the flexible duct in a convenient, comfortable location, and then easily secured to the in-place fittings, this duct system may be applied to both ends of the flexible duct, thus allowing a user to more effectively and conveniently connect a trunk duct to a register or grill.

DETAILED DESCRIPTION OF THE INVENTION

Figure 1:
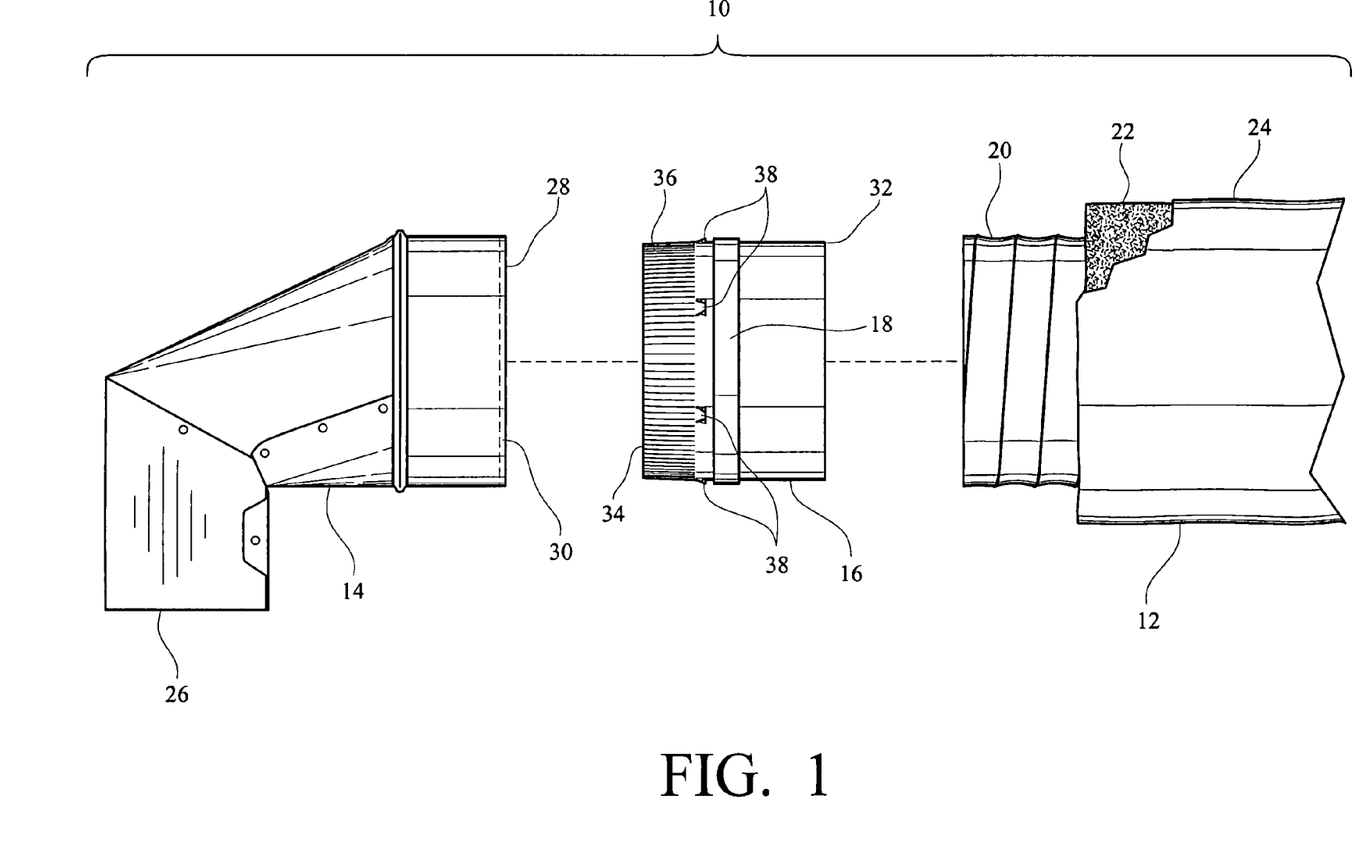
FIG. 1 is a side view of an exemplary duct system made in accordance with the present invention for use in connecting the flexible duct to a terminal fitting.

Referring now to FIG. 1, in a first exemplary embodiment of the flexible duct system 10 of the present invention, the flexible duct 12 is substantially identical in structure and function to existing flexible ducts widely used in HVAC applications, having a generally cylindrical shape and two ends. Again, such a flexible duct generally comprises an inner sleeve 20 of a Mylar® or similar polyester film containing a coil of wire to give it shape. This inner sleeve is then wrapped in insulation 22 (for example, fiberglass), with an outer sleeve 24 made of plastic or aluminum serving as an outermost layer for containing the insulation 22.

Referring still to FIG. 1, in this exemplary embodiment, the fitting 14 is a boot-shaped terminal fitting having two ends: a first end 26 defining a rectangular aperture designed to accommodate a floor or wall register or grill; and a second end 28 defining a generally circular aperture that includes an in-turned circumferential lip 30. Such a terminal fitting 14 would typically be manufactured from sheet metal, but other materials, such as various metals, plastic or fiberglass, could also be used without departing from the spirit and scope of the present invention. Furthermore, it should be recognized that it is not necessary to have a continuous in-turned circumferential lip 30 as illustrated in the accompanying Figures, as long as there is an edge surface adapted to engage the corresponding tabs 38 of the collar, as is further described below.

FIG. 1 further illustrates that the collar 16 is a generally thin-walled cylinder having a first end 32 and a second end 34. The first end 32 is adapted to be secured to the duct 12, with the collar 16 having a circumference sized such that the first end 32 fits snugly inside one end of the flexible duct 12. Similarly, the second end 34 of the collar 16 fits inside the second end 28 of the terminal fitting 14. In this exemplary embodiment, this is further facilitated by a crimped portion 36 at the second end 34 of the collar 16 which reduces the circumference of the collar 16 at its second end 34. More importantly, to secure the collar 16 to the terminal fitting 14, the second end 34 of the collar 16 includes a plurality of circumferentially arranged tabs 38 adapted to engage the in-turned circumferential lip 30 of the terminal fitting 14 when the second end 34 of the collar 16 is inserted into the terminal fitting 14. In the exemplary embodiment, the tabs 38 are button punches designed such that they flex radially inward as the second end 34 of the collar 16 is inserted into the second end 28 of the terminal fitting 14, and then extend radially when the tabs 38 pass the in-turned circumferential lip 30, as is further described below. The collar 16 of the exemplary embodiment is manufactured from sheet metal, but other materials, such as various metals, plastic or fiberglass, may be used without departing from the spirit and scope of the invention. Furthermore, although not illustrated in the accompanying Figures, it should be recognized that it is possible to have a substantially continuous tab or projection around the circumference of the second end 34 of the collar 16, rather than multiple discrete tabs, to engage the in-turned circumferential lip 30 without departing from the spirit and scope of the present invention.

FIG. 1 illustrates that this exemplary duct system 10 also includes a gasket 18 circumferentially arranged around the collar 16 such that when the second end 34 of the collar 16 is secured to the terminal fitting 14, and the first end 32 of the collar 16 is secured to the end of the flexible duct 12, the second end 28 of the terminal fitting 14 and the end of the flexible duct 12 each contact the gasket 18 so as to form a seal, as is further described below.

Figure 2:
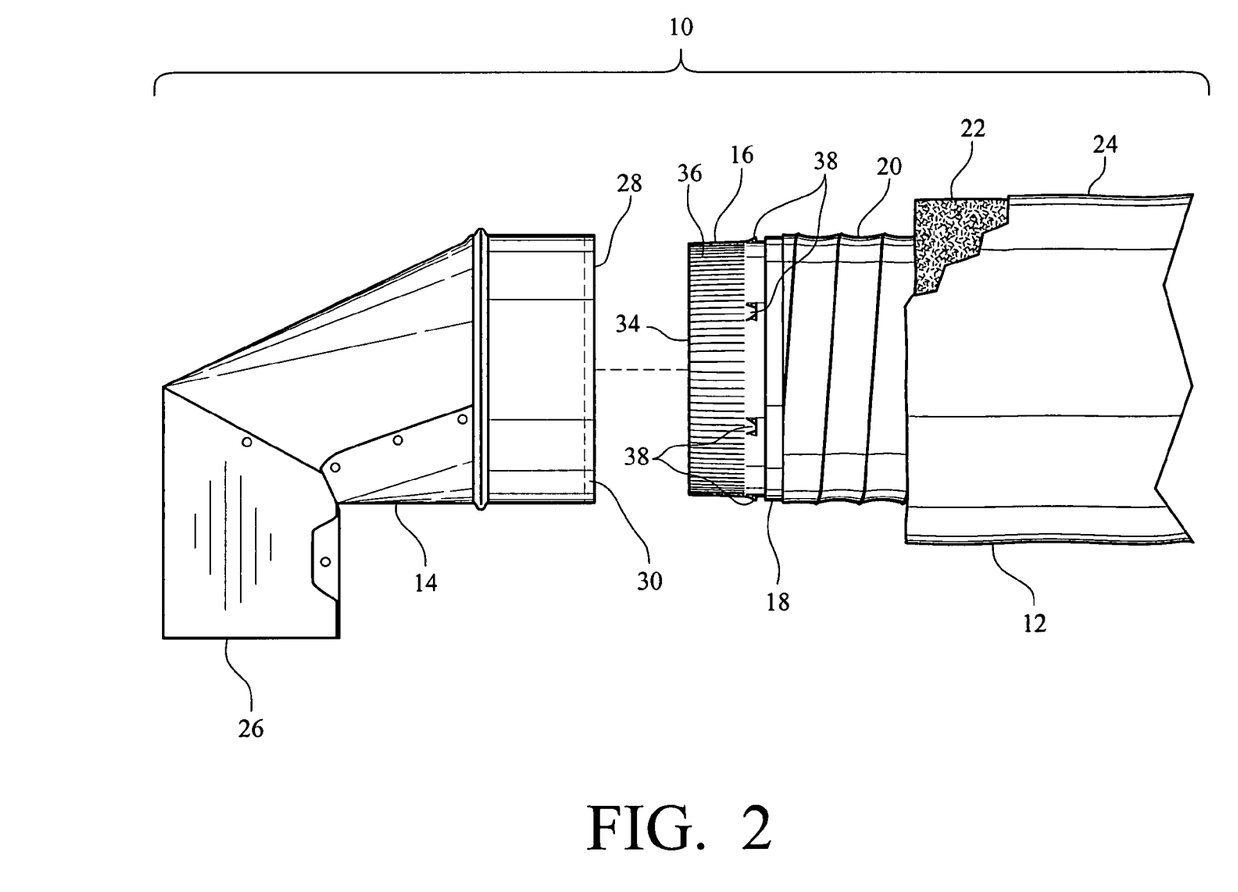
FIG. 2 is a side view of the exemplary duct system of FIG. 1, with the collar secured to the inner sleeve of the flexible duct.
Figures 4, 5:
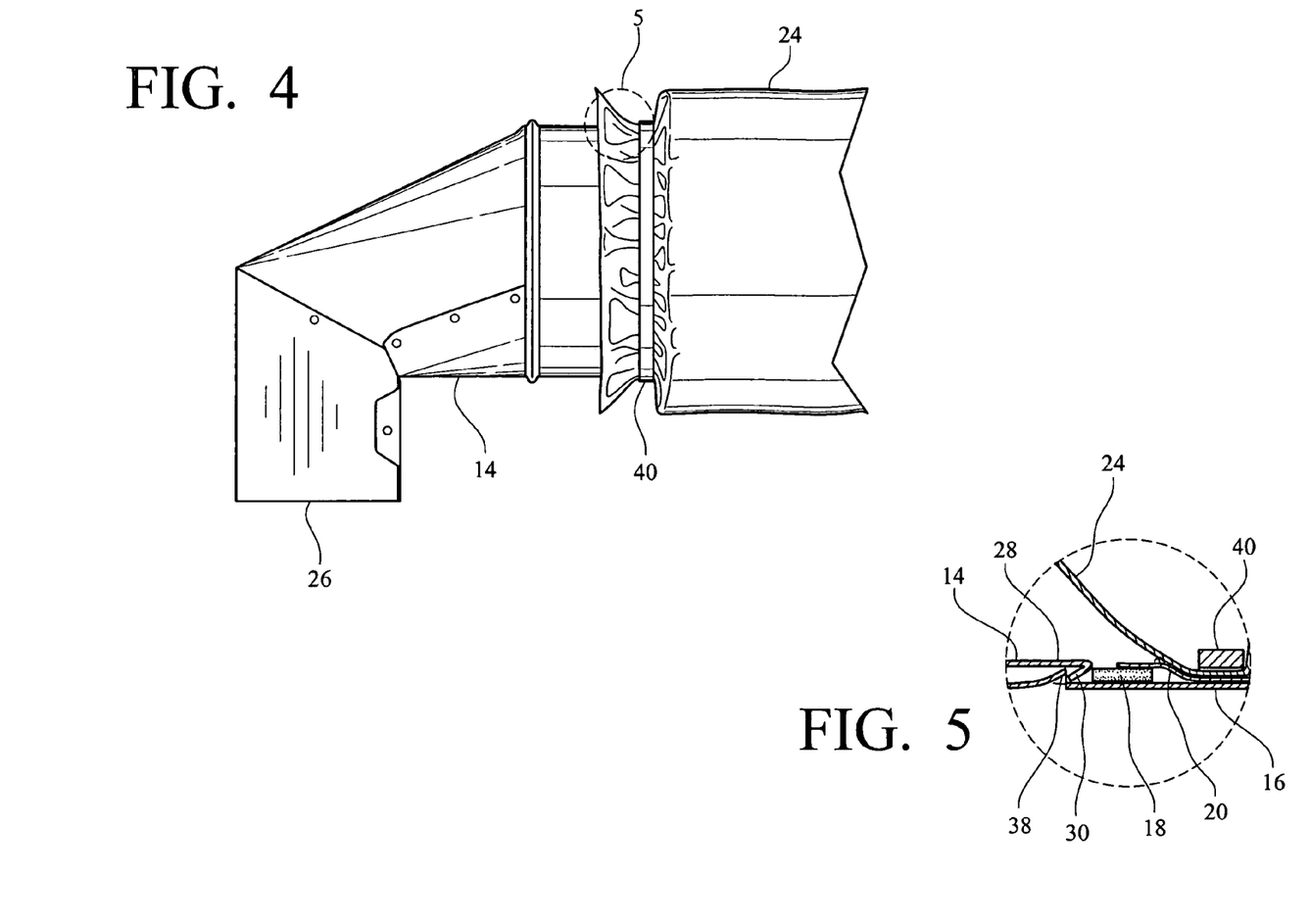
FIG. 4 is a side view of the exemplary duct system of FIG. 1 after installation has been completed.
FIG. 5 is an enlarged, partial cross-sectional view of the exemplary duct system of FIG. 1, further illustrating the relative positioning of the components after installation has been completed.

Referring now to FIG. 2, to assemble and install such a duct system 10, the first end 32 of the collar 16 is secured to the end of the flexible duct 12, and the second end 34 of the collar 16 is secured to the second end 28 of the terminal fitting 14. Specifically, a user of the duct system 10 first cuts the flexible duct 12 to an appropriate length, and slides the insulation 22 and outer sleeve 24 away from one end of the duct 12 such that a portion of the inner sleeve 20 axially extends beyond the insulation 22. The user then inserts the first end 32 of the collar 16 into the inner sleeve 20 of the flexible duct 12 such that the inner sleeve 20 contacts the gasket 18 to form a seal, thus minimizing air leakage between the flexible duct 12 and the collar 16. In this exemplary embodiment, and as best illustrated in FIG. 5, the gasket 18 may be a tape with two adhesive sides, such that the gasket 18 is circumferentially secured to the collar 16 by the adhesive on one side of the tape 18, and circumferentially secured to the flexible duct 12 by the adhesive on the other side of the tape 18. Furthermore, although not illustrated in the Figures, it should be recognized that such a gasket could also be positioned on an interior surface of the collar 16, with the flexible duct 12 being inserted into the first end 32 of the collar 16, with the inner sleeve 20 again contacting the gasket 18 to form a seal.

Figure 3:
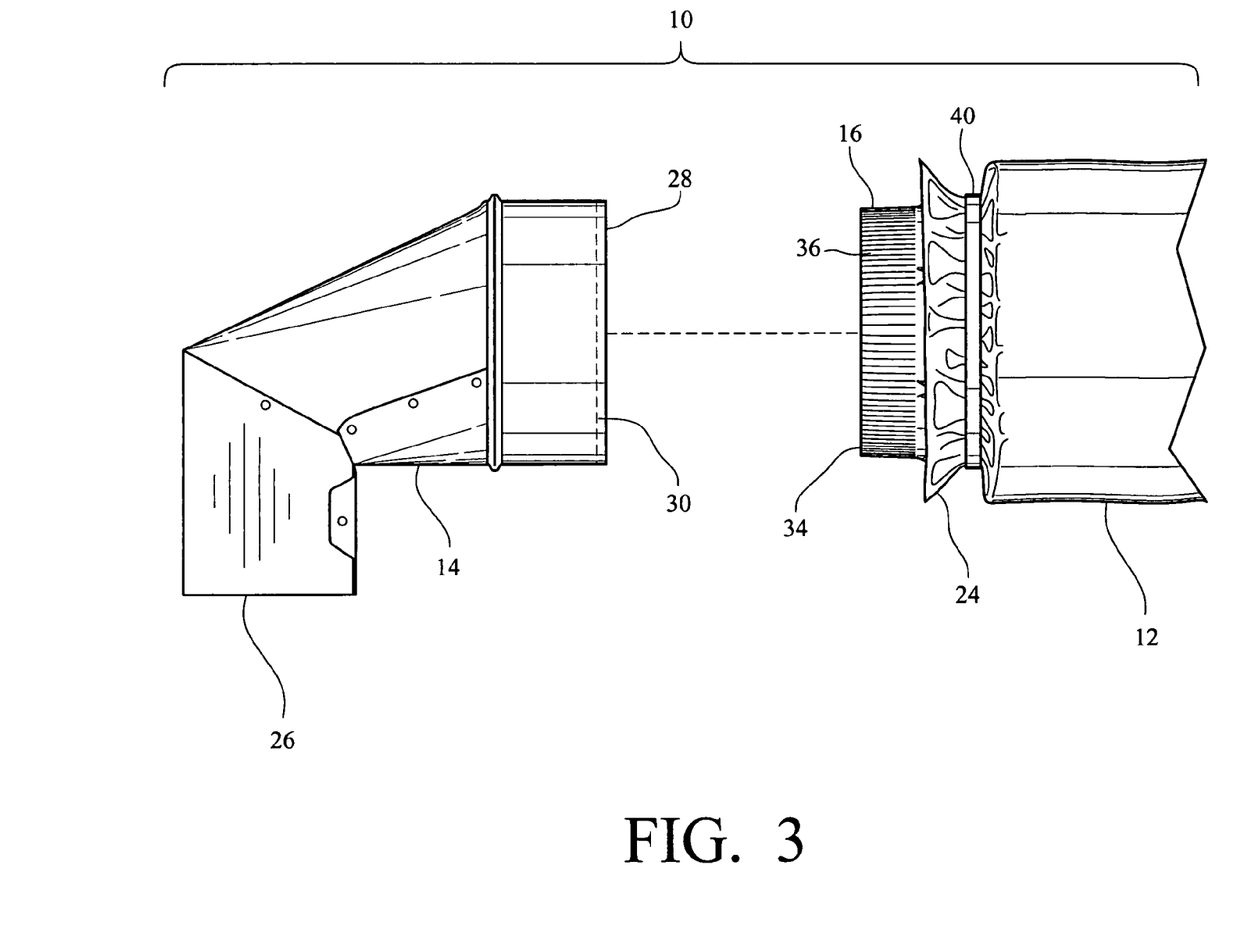
FIG. 3 is a side view of the exemplary duct system of FIG. 1, with the collar secured to the flexible duct.

Returning the exemplary embodiment illustrated in FIGS. 1-5, and referring specifically to FIG. 3, the user slides the outer sleeve 24 and insulation 22 of the flexible duct 12 back towards the collar 14, such that the insulation 22 ends roughly at the first end 32 of the collar 16, and the outer sleeve 24 extends past the inner sleeve 20. The user then tightens a zip tie 40 circumferentially around the outer sleeve 24 of the flexible duct 12 at the first end 32 of the collar 16, such that it secures the outer sleeve 24 and inner sleeve 20 of the flexible duct 12 to the first end 32 of the collar 16.

Lastly, referring now to FIGS. 4 and 5, the user inserts the second end 34 of the collar 16 into the second end 28 of the terminal fitting 14 such that the plurality of circumferentially arranged tabs 38 on the collar 16 engage the in-turned circumferential lip 30 on the second end 28 of the terminal fitting 14. As mentioned above, in this exemplary embodiment, the tabs 38 are button punches designed such that they flex radially inward as the second end 34 of the collar 16 is inserted into the second end 28 of the terminal fitting 14, and then extend radially when the tabs 38 pass the in-turned circumferential lip 30. Furthermore, as best illustrated in FIG. 5, the second end 28 of the terminal fitting 14 abuts and contacts the gasket 18 so as to form a seal, thus minimizing air leakage between the terminal fitting 14 and the collar 16.

Figure 6:
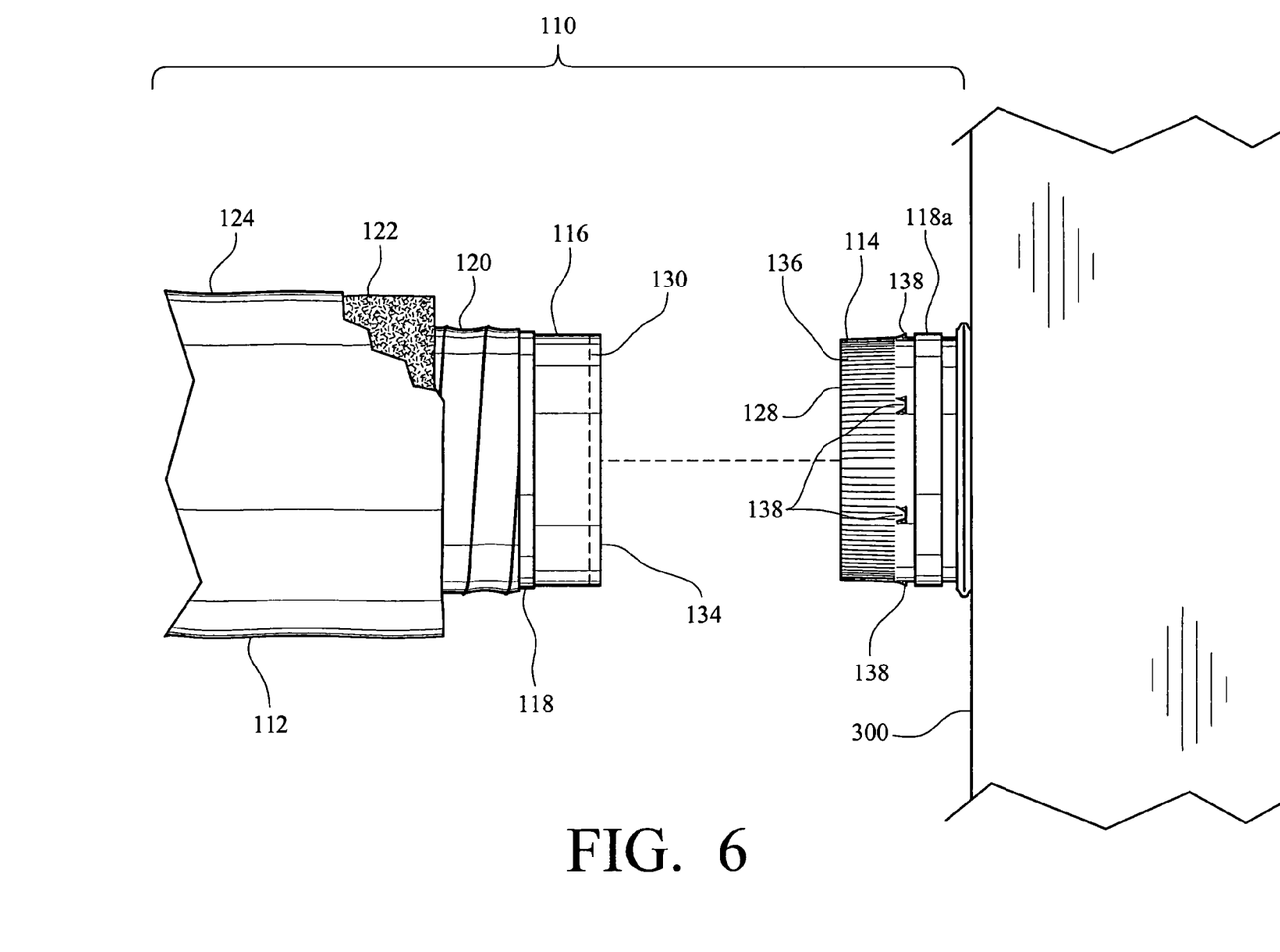
FIG. 6 is a side view of another exemplary duct system made in accordance with the present invention for use in connecting the flexible duct to a trunk duct, with the collar secured to the inner sleeve of the flexible duct.
Figure 7:
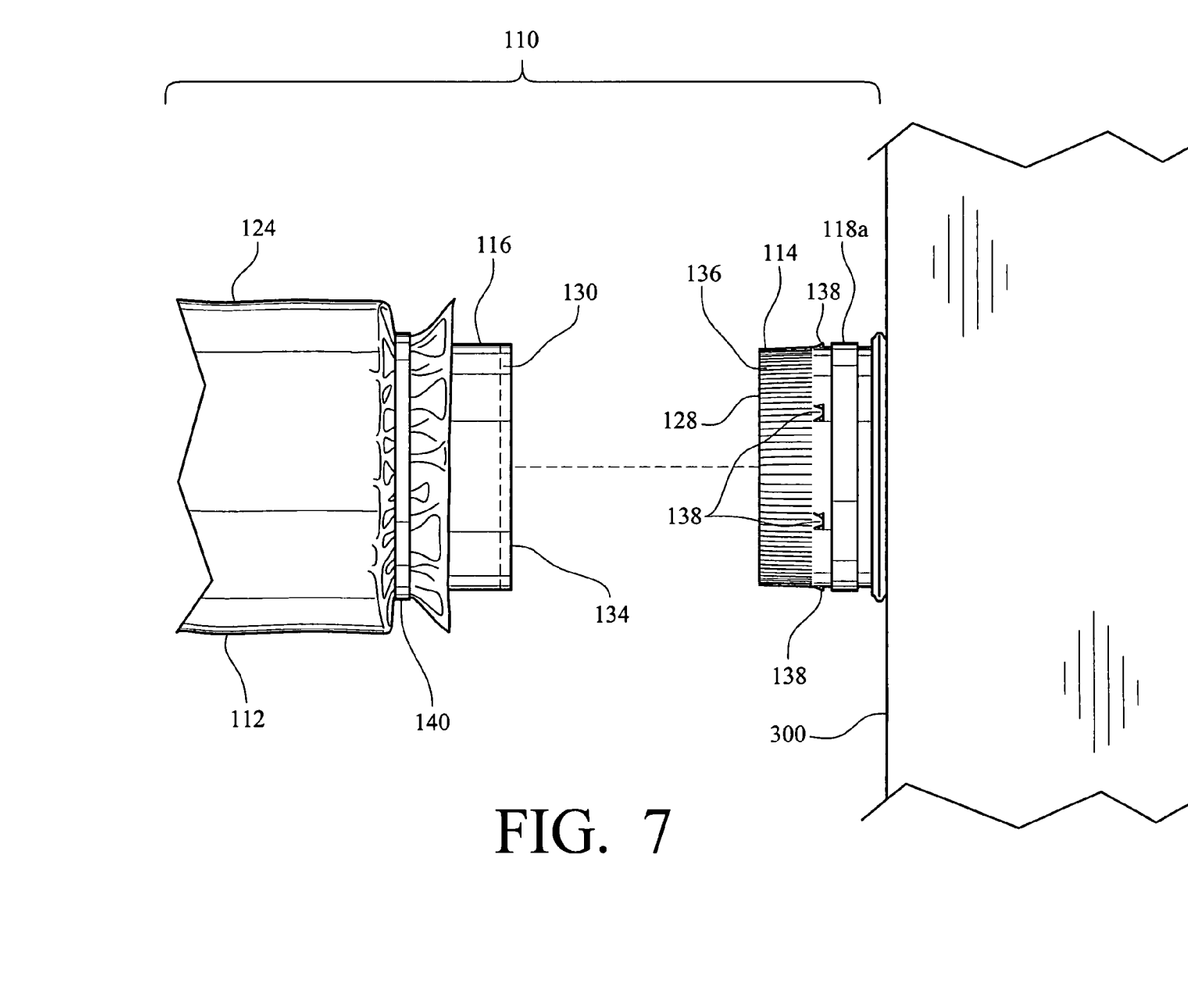
FIG. 7 is a side view of the duct system of FIG. 6, with the collar secured to the flexible duct.
Figure 8:
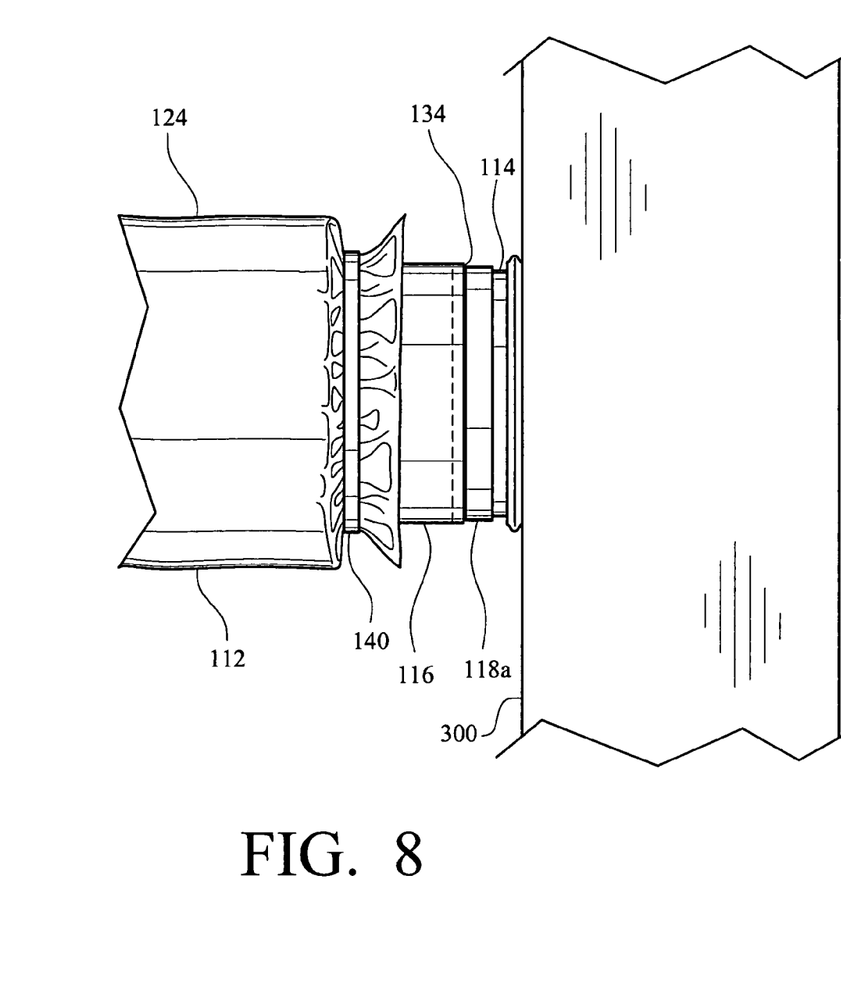
FIG. 8 is a side view of the duct system of FIG. 6 after installation has been completed.

FIGS. 6-8 illustrate another exemplary embodiment of a duct system 110 made in accordance with the present invention for use in connecting the flexible duct 112 to a trunk duct 300. Again, the flexible duct 112 is substantially identical in structure and function to existing flexible ducts widely used in HVAC applications, having a generally cylindrical shape and two ends. Furthermore, as with the embodiment described above with reference to FIGS. 1-5, the duct 112 generally comprises an inner sleeve 120 of a Mylar® or similar polyester film containing a coil of wire to give it shape. This inner sleeve 120 is then wrapped in insulation 122 (for example, fiberglass), with an outer sleeve 124 made of plastic or aluminum serving as an outermost layer for containing the insulation 122.

In this installation, the fitting is a trunk fitting 114, comprising a generally thin-walled cylinder having two ends: a first end (not shown) secured to a trunk duct 300 by utilizing known and customary techniques in the HVAC industry, and a second end 128. The second end 128 of the trunk fitting 114 includes a plurality of circumferentially arranged tabs 138. Furthermore, the trunk fitting 114 includes a crimped portion 136 to facilitate insertion of the second end 128 of the trunk fitting 114 into the collar 116, as is further described below. The trunk fitting 114 of the exemplary embodiment is manufactured from sheet metal, but other materials, such as various metals, plastic or fiberglass, may be used without departing from the spirit and scope of the invention. Also, although not illustrated in the accompanying Figures, it should be recognized that it is possible to have a substantially continuous tab or projection around the circumference of the second end 128 of the trunk fitting 114, rather than multiple discrete tabs, without departing from the spirit and scope of the present invention.

In this exemplary embodiment, the collar 116 again has two ends: a first end (not shown) and a second end 134. The first end of the collar 116 is adapted to be secured to the duct 112 in a manner identical to that described above with reference to FIGS. 1-5. Specifically, a user of the duct system 110 first cuts the flexible duct 112 to an appropriate length, and slides the insulation 122 and outer sleeve 124 away from one end of the duct 112 such that a portion of the inner sleeve 120 axially extends beyond the insulation 122. The user then inserts the first end of the collar 116 into the inner sleeve 120 of the flexible duct 112 such that the inner sleeve 120 contacts the gasket 118 to form a seal, thus minimizing air leakage between the flexible duct 112 and the collar 116. As with the exemplary embodiment described above with reference to FIGS. 1-5, the gasket 118 may be a tape with two adhesive sides, such that the gasket 118 is circumferentially secured to the collar 116 by the adhesive on one side of the tape 118, and circumferentially secured to the flexible duct 112 by the adhesive on the other side of the tape 118. In any event, the user slides the outer sleeve 124 and insulation 122 of the flexible duct 112 back towards the collar 114, such that the insulation 122 ends roughly at the first end of the collar 116, and the outer sleeve 124 extends past the inner sleeve 120. The user then tightens a zip tie 140 circumferentially around the outer sleeve 124 of the flexible duct 112 at the first end of the collar 116, such that it secures the outer sleeve 124 and inner sleeve 120 of the flexible duct 112 to the first end of the collar 116.

With respect to the second end 134 of the collar 116, in this exemplary embodiment, the second end 134 includes an in-turned circumferential lip 130 adapted to engage with the plurality of circumferentially arranged tabs 138 on the trunk fitting 114 when the second end 128 of the trunk fitting 114 is inserted into the collar 116. In this exemplary embodiment, the plurality of circumferentially arranged tabs 138 are button punches designed such that they flex radially inward as the second end 134 of the collar 116 is slid onto the second end 128 of the trunk fitting 114, and then extend radially when the plurality of circumferentially arranged tabs 138 pass the in-turned circumferential lip 130. Furthermore, it should be recognized that it is not necessary to have a continuous in-turned circumferential lip 130 as illustrated in the accompanying Figures, as long as there is an edge surface adapted to engage the corresponding tabs 138 of the collar 116.

Referring still to FIGS. 6-8, this exemplary duct system 110 also includes two gaskets. A first gasket 118 is circumferentially arranged around the collar 116, such that when the first end of the collar 116 is secured to the end of the flexible duct 112, the end of the duct 112 contacts the collar gasket 118 so as to form a seal, thus preventing air leakage between the flexible duct 112 and the collar 116. A second gasket 118a is circumferentially arranged around the trunk fitting 114, such that when the second end 134 of the collar 114 is slid onto the second end 128 of the trunk fitting 114, the in-turned circumferential lip 130 on the collar 116 contacts the fitting gasket 118a so as to form a seal, thus preventing air leakage between the collar 116 and the truck fitting 114.

Finally, from the above description, it should be clear that the structure and principles of the present invention can be applied to secure both flexible duct to trunk ducts at one end and registers or grills at the other end. Furthermore, although not illustrated in the accompanying Figures, it should be recognized that if flexible ducts were provided in fixed lengths, they could be readily secured to one another end-to-end by using the structure and principles of the present invention.

One of ordinary skill in the art will also recognize that additional embodiments are possible without departing from the teachings of the present invention or the scope of the claims which follow. This detailed description, and particularly the specific details of the exemplary embodiments disclosed therein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A duct system, comprising:
   a flexible duct including an inner sleeve containing a coil of wire, an outer sleeve, and insulation between the inner and outer sleeves;
   a fitting having an end including either an in-turned circumferential lip or a plurality of circumferentially arranged tabs;
   a collar having a first end and a second end, said first end being adapted to be secured to the flexible duct, and said second end being adapted to be secured to the end of said fitting, such that, if the end of said fitting includes an in-turned circumferential lip, the second end of said collar includes a plurality of circumferentially arranged tabs adapted to engage the in-turned circumferential lip of the end of said fitting, and if the end of said fitting includes a plurality of circumferentially arranged tabs, the second end of said collar includes an in-turned circumferential lip adapted to engage the plurality of circumferentially arranged tabs at the end of said fitting; and
   at least one gasket for forming a seal between said fitting and said collar, said gasket being circumferentially arranged around said collar and having an exposed adhesive surface, such that said collar is secured to the end of said flexible duct by adhering the inner sleeve of said flexible duct to the adhesive surface of said gasket.

2. The duct system as recited in claim 1, wherein said tabs are button punches that flex radially inward as the second end of said collar is inserted into the end of said fitting, and then extend radially as they pass the in-turned circumferential lip.

3. The duct system as recited in claim 1, wherein said fitting is a terminal fitting having two ends: a first end adapted to accommodate a register or grill; and a second end defining a generally circular aperture for receiving said collar.

4. The duct system as recited in claim 3, wherein said terminal fitting includes said in-turned circumferential lip, the second end of said collar including the plurality of circumferentially arranged tabs adapted to engage the in-turned circumferential lip of the end of said terminal fitting.

5. The duct system as recited in claim 4, wherein the second end of said collar includes a crimped portion to facilitate insertion of the second end of said collar into the second end of said terminal fitting.

6. The duct system as recited in claim 1, wherein said fitting is a trunk fitting secured to a trunk duct and including an end for insertion into said collar.

7. The duct system as recited in claim 6, wherein said trunk fitting includes the plurality of circumferentially arranged tabs, the second end of said collar including the in-turned circumferential lip adapted to engage the plurality of circumferentially arranged tabs.

8. The duct system as recited in claim 7, wherein said trunk fitting includes a crimped portion to facilitate insertion of the end of said trunk fitting into said collar.

9. A duct system, comprising:
   a flexible duct including an inner sleeve containing a coil of wire, an outer sleeve, and insulation between the inner and outer sleeves;
   a collar having a first end and a second end, said first end being adapted to be secured to the flexible duct, and said second end including one or more tabs;
   a terminal fitting having an end including an edge surface adapted to engage the corresponding tabs of said collar; and
   at least one gasket circumferentially arranged around said collar and having an exposed adhesive surface, such that said collar is secured to the end of said flexible duct by adhering the inner sleeve of said flexible duct to the adhesive surface of said gasket, and said gasket being positioned behind the one or more tabs of said collar, such that when the second end of said collar is inserted into and secured to said terminal fitting, the end of said terminal fitting contacts the gasket so as to form the seal between said terminal fitting and said collar.

10. The duct system as recited in claim 9, wherein said tabs are button punches that flex radially inward as the second end of said collar is inserted into the end of said fitting, and then extend radially as they pass the edge surface.

11. A duct system, comprising:
   a flexible duct including an inner sleeve containing a coil of wire, an outer sleeve, and insulation between the inner and outer sleeves;
   a trunk fitting having an end including one or more tabs;
   a collar having a first end and a second end, said first end being adapted to be secured to the flexible duct, said second end including an edge surface adapted to engage the corresponding tabs at the end of said trunk fitting; and
   at least one gasket circumferentially arranged around said collar and having an exposed adhesive surface, such that said collar is secured to the end of said flexible duct by adhering the inner sleeve of said flexible duct to the adhesive surface of said gasket, and said gasket being positioned behind the one or more tabs of said collar, such that when the end of said trunk fitting is inserted into and secured to said collar, the end of said trunk fitting contacts the gasket so as to form the seal between said trunk fitting and said collar.

12. The duct system as recited in claim 11, wherein said tabs are button punches that flex radially inward as the end of said trunk fitting is inserted into the second end of said collar, and then extend radially as they pass the edge surface.

* * * * *